US010333822B1

(12) United States Patent
Jeuk et al.

(10) Patent No.: US 10,333,822 B1
(45) Date of Patent: Jun. 25, 2019

(54) TECHNIQUES FOR IMPLEMENTING LOOSE HOP SERVICE FUNCTION CHAINS PRICE INFORMATION

(71) Applicant: CISCO TECHNOLOGY, INC., San Jose, CA (US)

(72) Inventors: Sebastian Jeuk, San Jose, CA (US); Gonzalo Salgueiro, Raleigh, NC (US); James Guichard, New Boston, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/602,638

(22) Filed: May 23, 2017

(51) Int. Cl.
*H04L 29/06* (2006.01)
*H04L 12/721* (2013.01)
*H04L 12/725* (2013.01)

(52) U.S. Cl.
CPC ............ *H04L 45/12* (2013.01); *H04L 45/308* (2013.01); *H04L 69/22* (2013.01)

(58) Field of Classification Search
CPC ........ H04L 45/12; H04L 45/308; H04L 69/22
See application file for complete search history.

(56) References Cited

U.S. PATENT DOCUMENTS

| 8,040,808 | B1 | 10/2011 | Kasturi et al. |
| 8,396,458 | B2 | 3/2013 | Raleigh |
| 9,253,545 | B2 | 2/2016 | Lemmons |
| 9,491,094 | B2 | 11/2016 | Patwardhan et al. |
| 9,853,869 | B1 * | 12/2017 | Shaham ................. H04L 67/10 |
| 2013/0343396 | A1 * | 12/2013 | Yamashita ............ H04L 45/124 370/401 |
| 2015/0043383 | A1 * | 2/2015 | Farkas .................... H04L 45/22 370/254 |
| 2015/0333930 | A1 | 11/2015 | Aysola et al. |
| 2016/0094667 | A1 * | 3/2016 | Jani ......................... H04L 69/32 709/202 |
| 2016/0134481 | A1 * | 5/2016 | Akiya ................. H04L 41/5058 709/224 |
| 2016/0165014 | A1 * | 6/2016 | Nainar .................... H04L 69/22 370/392 |
| 2016/0261495 | A1 * | 9/2016 | Xia ......................... H04L 45/58 |
| 2016/0294681 | A1 | 10/2016 | Khakpour et al. |

(Continued)

FOREIGN PATENT DOCUMENTS

WO      2015/026386      2/2015

OTHER PUBLICATIONS

U.S. Appl. No. 15/602,994, filed May 23, 2017, entitled "Techniques for Loose Hop Service Function Chains," Inventors Sebastian Jeuk, et al.

*Primary Examiner* — Ivan O Latorre (57) ABSTRACT

A method is described and in one embodiment includes receiving at a forwarding node of a Service Function Chain ("SFC")-enabled network a packet having a packet header including at least one context header comprising metadata information for the packet, wherein the metadata information comprises price information indicative of a value of a traffic flow of which the packet comprises a part; identifying based on the metadata information and at least one of network state and environmental information a Virtual Network Function ("vNF") to which to forward the packet for processing; and forwarding the packet to the identified vNF for processing.

20 Claims, 7 Drawing Sheets

(56) References Cited

U.S. PATENT DOCUMENTS

| | | | |
|---|---|---|---|
| 2016/0314014 A1* | 10/2016 | Dow | G06F 9/45558 |
| 2016/0323183 A1 | 11/2016 | Jeuk et al. | |
| 2016/0330083 A1 | 11/2016 | Djukic et al. | |
| 2016/0330111 A1* | 11/2016 | Manghirmalani | H04L 43/028 |
| 2016/0352629 A1 | 12/2016 | Wang et al. | |
| 2016/0373346 A1* | 12/2016 | Hirota | H04L 45/38 |
| 2017/0017510 A1* | 1/2017 | Itoh | G06F 9/46 |
| 2017/0019302 A1 | 1/2017 | Lapiotis et al. | |
| 2018/0309675 A1* | 10/2018 | Xu | H04L 12/18 |

\* cited by examiner

TECHNIQUES FOR IMPLEMENTING LOOSE HOP SERVICE FUNCTION CHAINS PRICE INFORMATION

TECHNICAL FIELD

This disclosure relates in general to the field of communications networks and, more particularly, to techniques for implementing loose hop service function chaining using price information in such communications networks.

BACKGROUND

The delivery of end-to-end services in a communications network often requires the performance of a variety of service functions. Such service functions may include, but are not limited to, firewalls and traditional IP Network Address Translators ("NATs"), as well as application-specific functions. The definition and instantiation of an ordered set of service functions and the subsequent steering of traffic through those functions is referred to as service function chaining, or simply service chaining. In the process, the traffic is serviced as per policy in the service functions and the service chaining infrastructure. Service Function Chains ("SFCs") are defined based on certain criteria that meet a particular business outcome for an operator. One such criteria could be the price settings provided by an operator that differentiates the service applied to the traffic of a given subscriber. Currently, in such a scenario, a separate SFC will be defined for each price setting, or price point, and traffic may then be classified into a particular SFC based upon the service paid for by a subscriber. Hence, a separate and unique SFC is defined for each potential price point, which results in an increase in the number of SFCs that must be defined within an operator's network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is described and in one embodiment includes receiving at a forwarding node of a Service Function Chain ("SFC")-enabled network a packet having a packet header including at least one context header comprising metadata information for the packet, wherein the metadata information comprises price information indicative of a value of a traffic flow of which the packet comprises a part; identifying based on the metadata information and at least one of network state and environmental information a Virtual Network Function ("vNF") to which to forward the packet for processing; and forwarding the packet to the identified vNF for processing.

Example Embodiments

The following disclosure provides many different embodiments, or examples, for implementing different features of the present disclosure. Specific examples of components and arrangements are described below to simplify the present disclosure. These are, of course, merely examples and are not intended to be limiting. Furthermore, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

To accommodate agile networking and flexible provisioning of network nodes in a network, service chaining may be used to ensure an ordered set of service functions are applied to packets and/or frames of a traffic flow. Service chaining provides a method for deploying service functions in a manner that enables dynamic ordering and topological independence of the service functions. A service chain may define an ordered set of service functions to be applied to packets and/or frames of a traffic flow, wherein a particular service chain is selected as a result of classification. The implied order may not be a linear progression, as the architecture may allow for nodes that copy to more than one branch. Service functions may be deployed as Virtual Network Functions ("vNFs") and the terms vNF and service function may be used interchangeably herein.

Service chaining involves a classifier function that performs classification based on policies configured by a control plane element to select a service chain to process traffic and load balances the traffic among instances of the selected service chain. Once the classifier function selects a service chain instance (a.k.a. service function path or "SFP"), it forwards the traffic along a service function path ("SFP"), or simply, a service path, through one or more service-aware forwarding elements ("FEs"). In one certain embodiment, each forwarding element implements a service function forwarder ("SFF") capability described in an IETF draft entitled "Service Function Chaining (SFC) Architecture" (IETF RFC7665—https://datatracker.ietf.org/doc/rfc7665/) (hereinafter "SFC Architecture RFC"). The forwarding elements forward the traffic to the actual service functions that are logically anchored to, and/or instantiated on, the forwarding element. Forwarding of traffic between any two components in such an architecture, and hence along the service chains, is performed over an overlay network. Overlay networks are realized via a transport header and an encapsulation header. Various network encapsulation headers have been employed to forward traffic, requiring service through the service chains. Such network encapsulation headers encapsulate the original packet, or frame, and are themselves encapsulated in an overlay transport protocol. Examples of encapsulation headers include proprietary headers, such as vPath, or proposed IETF standard headers, such as Network Service Header ("NSH"). Transport protocols used to carry such encapsulated packets may be L3- or L4-based, such as IPv4/IPv6 or GRE or UDP, VxLAN, etc. In the case of vPath, even L2-based, such as LLC SNAP.

Service chaining involves steering user/application traffic through a list of ordered service functions (such as firewalls, DPI, NAT, Optimizers, Ad insertion, CDN, etc.) before forwarding onwards to its destination, in the process servicing the traffic as per policy. These service chains are typically heterogeneous with best of breed functions from different vendors. In the legacy data centers with physical service appliances, the deployment of service chains involved manually installing the appliances and connecting them via VLANs. There was not much scope for automation beyond application of configuration to the switches and appliances through primitive methods.

Figure 1A:
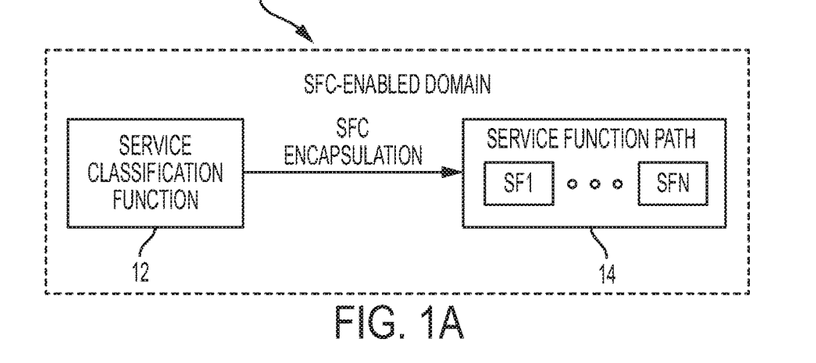
FIG. 1A is an SFC-enabled domain, which may include an initial classification function as an entry point into a service function path, in accordance with embodiments described herein.

FIG. 1A illustrates an SFC-enabled domain 10, which may include an initial service classification function (or "classifier") 12, as an entry point to a service path. The initial service classification function 12 prescribes an instance of the service path, designated in FIG. 1A by a reference numeral 14, and encapsulates a packet or frame with service path information that identifies the service path. The classification function 12 may potentially add metadata, or shared context to the SFC encapsulation part of the packet or frame. The service path 14 may include a plurality of service functions, designated in FIG. 1A by SF1, SF2, . . . SFN.

A service function may be responsible for specific treatment and/or processing of received packets. A service function may act at the network layer or other OSI layers (e.g., application layer, presentation layer, session layer, transport layer, data link layer, and physical link layer). A service function may be a virtual instance or be embedded in a physical network element, such as a service node. When a service function or other modules of a service node are executed by the at least one processor of the service node, the service function or other modules may be configured to implement any one of the methods described herein. Multiple service functions can be embedded in the same network element. Multiple instances of the service function can be enabled in the same administrative SFC-enabled domain. A non-exhaustive list of service functions includes firewalls, WAN and application acceleration, Deep Packet Inspection ("DPI"), server load balancers, NAT44, NAT64, HOST_ID injection, HTTP Header Enrichment functions, TCP optimizer, and others. A service function may be SFC-encapsulation aware; that is, it may receive and act on information in the SFC encapsulation, or unaware in which case data forwarded to the service does not contain the SFC encapsulation.

A service node may be a physical network element (or a virtual element embedded on a physical network element) that hosts one or more service functions and may have one or more network locators associated with it for reachability and service delivery. In many standardization documents, "service functions" can refer to the service nodes described herein as having one or more service functions hosted thereon. SFP, or simply service path, relates to the instantiation of a service chain in a network. Packets follow a service path from a classifier through the requisite service functions.

Figure 1B:
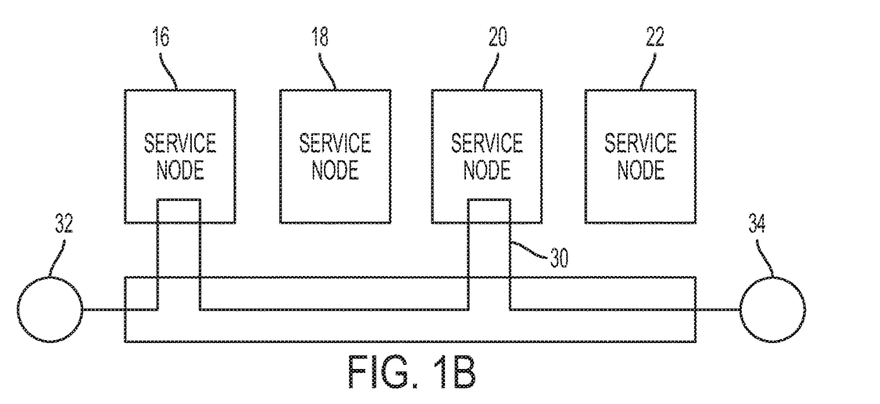
FIG. 1B illustrates a simplified block diagram of a service function chain, which may include an initial classification function as an entry point into a service function path, in accordance with embodiments described herein.
Figure 1C:
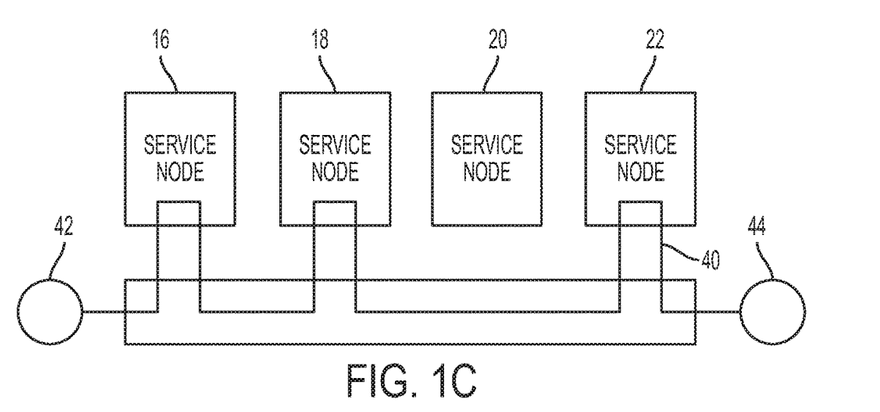
FIG. 1C illustrates a simplified block diagram of another service function chain, which may include an initial classification function as an entry point into a service function path, in accordance with embodiments described herein.

FIGS. 1B-1C illustrate different service paths that may be realized using service function chaining. These service paths may be implemented by encapsulating packets of a traffic flow with a network service header ("NSH") or some other suitable packet header which specifies a desired service path (e.g., by identifying a particular service path using service path information in the NSH) through one or more of service nodes 16, 18, 20, and 22. In the example shown in FIG. 1B, a service path 30 may be provided between an endpoint 32 and an endpoint 34 through service node 16 and service node 20. In the example shown in FIG. 1C, a service path 40 (a different instantiation) can be provided between end point 42 and endpoint 44 through service node 16, service node 18, and service node 22.

Generally speaking, an NSH includes service path information, and NSH is added to a packet or frame. For instance, an NSH can include a data plane header added to packets or frames. Effectively, the NSH creates a service plane. The NSH includes information for service chaining, and in some cases, the NSH can include metadata added and/or consumed by service nodes or service functions. The packets and NSH are encapsulated in an outer header for transport. To implement a service path, a network element such as a service classifier ("SCL") or some other suitable SFC-aware network element can process packets or frames of a traffic flow and performs NSH encapsulation according to a desired policy for the traffic flow.

Figure 2A:
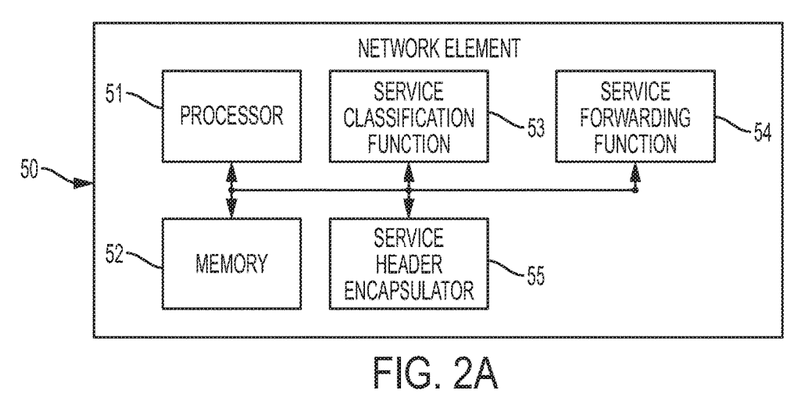
FIG. 2A is a simplified block diagram of a first type of service function chain-aware network element for performing efficient service chain analysis of a traffic flow in accordance with embodiments described herein.

FIG. 2A shows a system view of SFC-aware network element 50, e.g., such as an initial service classifier, for prescribing a service path of a traffic flow, according to some embodiments of the disclosure. Network element 50 includes processor 51 and (computer-readable non-transitory) memory 52 for storing data and instructions. Furthermore, network element 50 may include a service classification function 53, a service forwarding function 54, and a service header encapsulator 55, all of which may be provided by processor 51 when processor 51 executes the instructions stored in memory 52. Service forwarding function 54 determines how to forward service encapsulated packets at a classifier or a forwarding network element (see FIG. 2B below).

The service classification function 53 can process a packet of a traffic flow and determine whether the packet requires servicing and correspondingly which service path to follow to apply the appropriate service. The determination can be performed based on business policies and/or rules stored in memory 52. Once the determination of the service path is made, service header encapsulator 55 generates an appropriate NSH having identification information for the service path and adds the NSH to the packet. The service header encapsulator 55 provides an outer encapsulation to forward the packet to the start of the service path. Other SFC-aware network elements are thus able to process the NSH while other non-SFC-aware network elements would simply forward the encapsulated packets as is. Besides inserting an NSH, network element 50 can also remove or not add the NSH if the service classification function 53 determines the packet does not require servicing.

Figure 2B:
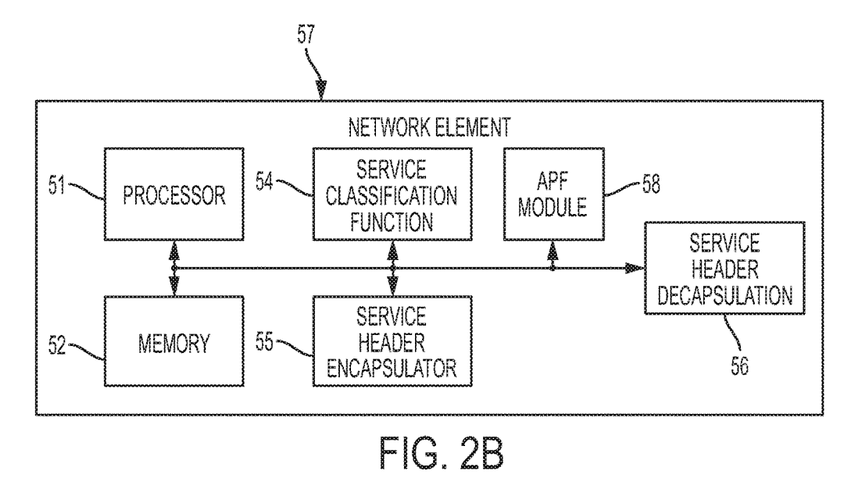
FIG. 2B is a simplified block diagram of a second type of service chain function-aware network element for performing efficient service chain analysis of a traffic flow in accordance with embodiments described herein.

FIG. 2B shows a system view of an SFC-aware network element 57, e.g., such as a forwarding element or SFF, for forwarding service flows to service functions and to other SFFs as prescribed, according to some embodiments of the disclosure. Network element 57 is identical in all respects to network element 50 except that network element 57 includes a service header decapsulator module 56, for decapsulating packets received at the network element 57 from another node, and a loose hop processing ("LHP") module 58, for purposes that will be described in detail below, and does not include service classification function 53.

An NSH may include a (e.g., 64-bit) base header, and one or more context headers. Generally speaking, the base header provides information about the service header and service path identification ("SPI"), and context headers may carry opaque metadata (such as the metadata described herein reflecting the result of classification). For instance, an NSH can include a 4-byte base header, a 4-byte service path header, and optional context headers. The base header can provide information about the service header and the payload protocol. The service path header can provide path identification and location (i.e., service function) within a path. The variable length context headers can carry opaque metadata and variable length encoded information. The one or more optional context headers make up a context header section in the NSH. For instance, the context header section can include one or more context header fields having pieces of information therein, describing the packet/frame. Based on the information in the base header, a service function of a service node can, for instance, derive policy selection from the NSH. Context headers shared in the NSH can, for instance, provide a range of service-relevant information such as traffic classification, end point identification, etc. Service functions can use NSH to select local service policy.

Figure 3:
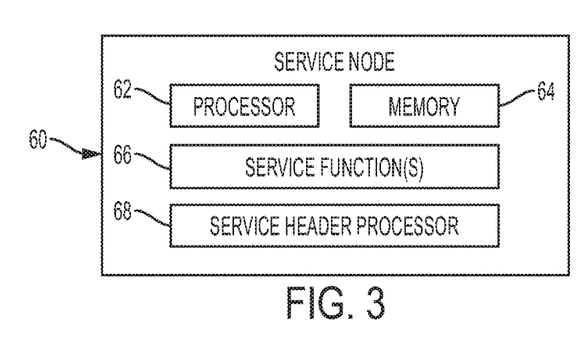
FIG. 3 is a simplified block diagram of a service node in accordance with embodiments described herein.

Once properly classified and encapsulated by the classifier, the packet having the NSH may be then forwarded to one or more service nodes where service(s) can be applied to the packet/frame. FIG. 3 shows a system view of a service node, according to some embodiments of the disclosure. Service node 60, generally a network element, can include processor 62 and (computer-readable non-transitory) memory 64 for storing data and instructions. Furthermore, service node 60 may include service function(s) 66 (e.g., for applying service(s) to the packet/frame, classifying the packet/frame) and service header processor 68. The service functions(s) 66 and service header processor 68 can be provided by processor 62 when processor 62 executes the instructions stored in memory 64. Service header processor 68 can extract the NSH, and in some cases, update the NSH as needed. For instance, the service header processor 68 can decrement the service index. If the resulting service index=0, the packet is dropped. In another instance, the service header processor 68 or some other suitable module provide by the service node can update context header fields if new/updated context is available. In certain situations, the service node does not understand the NSH and is said to be "NSH unaware." In these situations, the NSH is stripped by the SFF before the packet is delivered to the service node.

As previously noted, service chaining involves a classifier function performing classification based on policies configured by a control plane to select service chains and perform load balancing among instances of the service chains. The classifier function then forwards the traffic along the SFP through one or more service-aware forwarding elements. Forwarding elements implement a service function forwarder ("SFF") capability described in the aforementioned SFC Architecture IETF Draft. The forwarding elements forward the traffic to the actual service chain nodes that are logically anchored to the forwarding element. Forwarding of traffic between any two components in such an architecture, and hence through the service chains, is performed over an overlay network. As previously noted, overlay networks are realized via a transport header and an encapsulation header. Various network encapsulation headers have been employed to forward traffic, requiring service through the service chains. Such headers encapsulate the original packet, or frame, and are themselves encapsulated in an overlay transport protocol. Examples of encapsulation headers include proprietary headers such as vPath or proposed IETF standard headers, such as Network Service Header ("NSH"). The transport protocols used to carry such encapsulations are typically L3 or L4 based, such as IPv4/IPv6 or GRE or UDP, VxLAN, etc. In the case of vPath, even L2 protocols, such as LLC SNAP, may be used.

By way of an example, a service chain $SC_1$ may be described in terms of service function ("SF") types:

$$SC_1 = SF_a, SF_b, SF_c$$

Corresponding service chain instances, i.e., the service paths ("SPs"), may be constructed from instances of the service function type:

$$SP_{1.1} = SF_{a1}, SF_{b1}, SF_{c1}$$

$$SP_{1.2} = SF_{a1}, SF_{b2}, SF_{c2}$$

Figure 4:
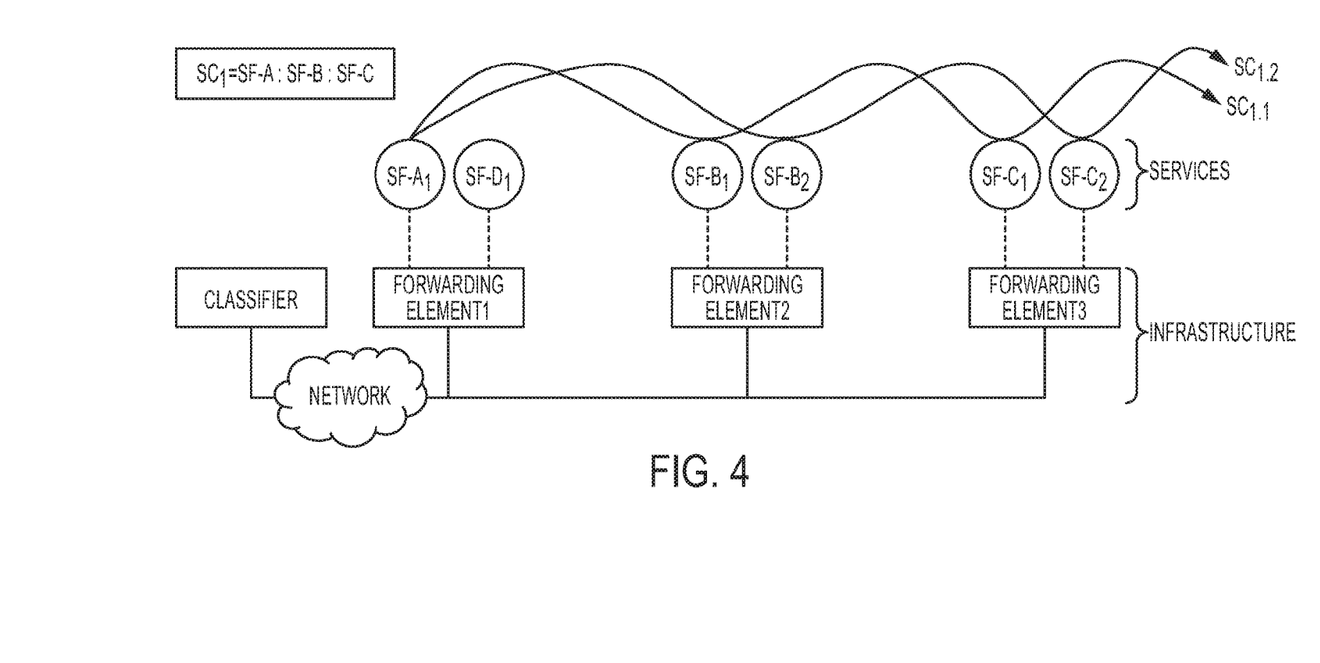
FIG. 4 illustrates two example service paths in accordance with embodiments described herein.
Figure 5:
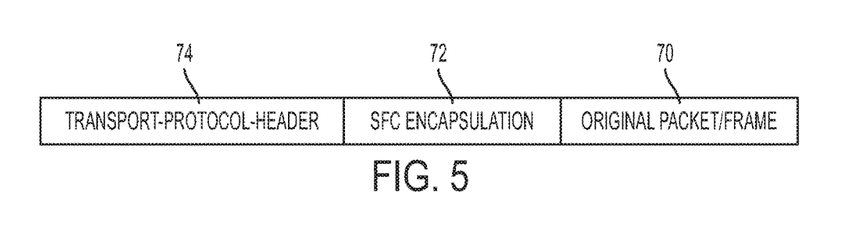
FIG. 5 illustrates an example packet structure in accordance with embodiments described herein.

As illustrated in FIG. 4, service chain SC1 maps to two service paths SP1.1 and SP1.2. Classifier selects the service chain SC1 and load balances between instances SP1.1 and SP1.2. In general, packets forwarded between the components, such as, between classifier and forwarding element or forwarding element and service function, is of the form illustrated in FIG. 5 and include an original packet/frame 70, SFC encapsulation 72, and a transport protocol header 74. The SFC encapsulation 72 may be implemented using an NSH. As previously noted, NSH includes a base header, a service header, and a fixed/variable number of metadata TLVs as described in IETF draft entitled "Network Service Header" (draft-ietf-sfc-nsh-01.txt) (hereinafter "NSH IETF Draft").

Figure 6:
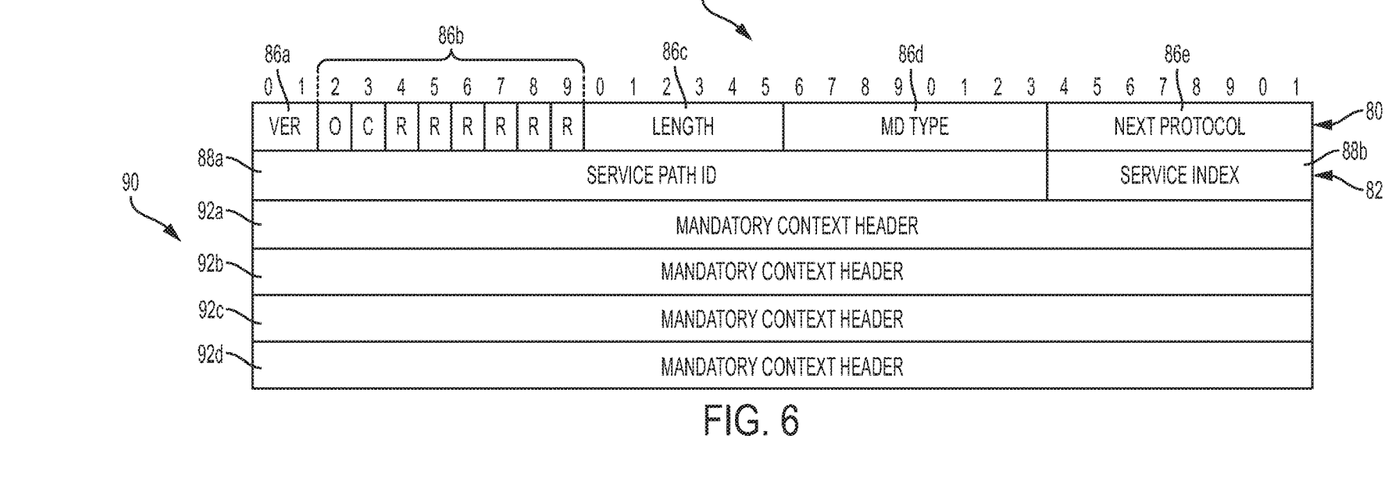
FIG. 6 illustrates an example arrangement of base and service path headers a conventional Network Service Header ("NSH") in accordance with embodiments described herein.

FIG. 6 shows the format of a base header 80 and a service path header 82 of an NSH 84 for implementing features of embodiments described herein. As shown in FIG. 6, the base header 80 includes a version field 86a, a number of individual bits/flags, collectively designated by a reference numeral 86b, a length field 86c, a metadata ("MD") type field 86d, and a next protocol field 86e. The service path header 82 includes a Service Path ID field 88a and a Service Index field 88*b*. The fields and their contents are described in detail in the aforementioned NSH IETF Draft. In some cases, NSH requires that the Service Index ("SI") must be decremented by the service functions. Also, in some cases, NSH requires that the FEs must forward NSH encapsulated traffic based Service Path ID ("SPI") and Service Index ("SI"), as received from other components. As described above, both the SPI and the SI, which are included in the service path header of an NSH, are needed to make a forwarding decision. The control plane constructs the SPIs and distributes them into the forwarding elements along with SI and decrement value (i.e., the amount by which to decrement the SI).

NSH 82 also includes a metadata portion 90, the structure and format of which is dictated by the contents of the MD type field 86*d*. For example, if the MD type field 86*d* indicates MD Type 1 (i.e., fixed length), then the metadata portion 90 must include 4 four-byte context headers, represented in FIG. 6 by context headers 92*a*-92*d*. If the MD type field 86*d* indicates MD type 2 (i.e., variable length), then the metadata portion 90 will include zero or more variable length context headers. Although the embodiment illustrated in FIG. 6 is an MD Type 1, it will be recognized that either MD type may be used to implement the embodiments described herein.

The type of metadata included in the NSH Type 1 or Type 2 header defines the loose hop chain criteria and how hops are selected at different stages of the chain. For example, if the NSH Type 2 metadata fields include cloud identifiers (cloud ID, service ID, and tenant ID), the loose hop chain can be defined from the forwarder on a per-service and per-tenant basis. Hence, each tenant might be processed by a different chain without having to statically pre-define the chains up front (i.e., at the classifier). In general, the metadata is the driving factor of how a loose hop chain is traversed by specific packets. The path traversed by the packets can be different for every packet entering the defined loose hop chain. As a result, a loose hop chain can react dynamically and adjust itself on demand depending on the packets, the metadata contained therein, and current network conditions.

In general, Service Function Chains are defined based on certain criteria that meet a particular business outcome for an operator. One of those criteria could be the price settings provided by an operator that differentiate the service applied to the traffic of a given subscriber. Using previous techniques, a particular SFC is defined for each price point and a subscriber's traffic is be classified to one of the SFCs based upon the service for which the subscriber has paid. Hence, a separate SFC is required to be defined for each price point, resulting in a large number of SFCs that must be defined within the operator's network.

In accordance with features of embodiments described herein, techniques are provided to enable an operator to classify and redirect traffic toward specific service functions (or vNFs) dynamically ("on-the-fly") at the forwarding elements based upon the subscribed service and price point of that service. Using techniques described herein, an operator is able to define a single loose hop service chain such that a subscriber's individual traffic flows may be classified into the same loose hop service chain but be directed through different SFs at the forwarding elements of the service chain based upon a price point of the subscribed service.

As defined herein, a loose hop service chain extends the base characteristics of SFCs, encompassing the necessary functionality for dynamically adjusting SFCs and associated paths through vNFs based on the subscribed service and price point of the service. In certain embodiments, a loose hop SFC enables network operators to define a single SFC that is capable of adjusting according to the subscribed service and price point of the service included as metadata included in the NSH metadata Type 1 or Type 2 fields, thereby eliminating the need to define a single chain per price point. Embodiments described herein provide means for an administrator to define a SFC by loosely associating vNFs therewith and defining what criteria should be used to select from among the loosely associated vNFs at each forwarding element.

In conventional service function chaining, service paths are defined up front with a set of very specific vNFs and the corresponding order in which the vNFs are to be executed. In contrast, in accordance with embodiments described herein, loose hop service paths are defined, which are capable of adjusting both in selecting vNFs and the order of vNFs traffic traverses dynamically and on the fly. In one embodiment described herein, loose hop SFCs may be used to dynamically select deployment types of vNFs. These deployment types can be selected based on certain characteristics to fulfill SLA agreements. In another embodiment described herein, machine learning algorithms may be integrated into the SFCs to analyze traffic behavior and dynamically adjust SFC paths at the forwarding elements accordingly.

Figure 7:
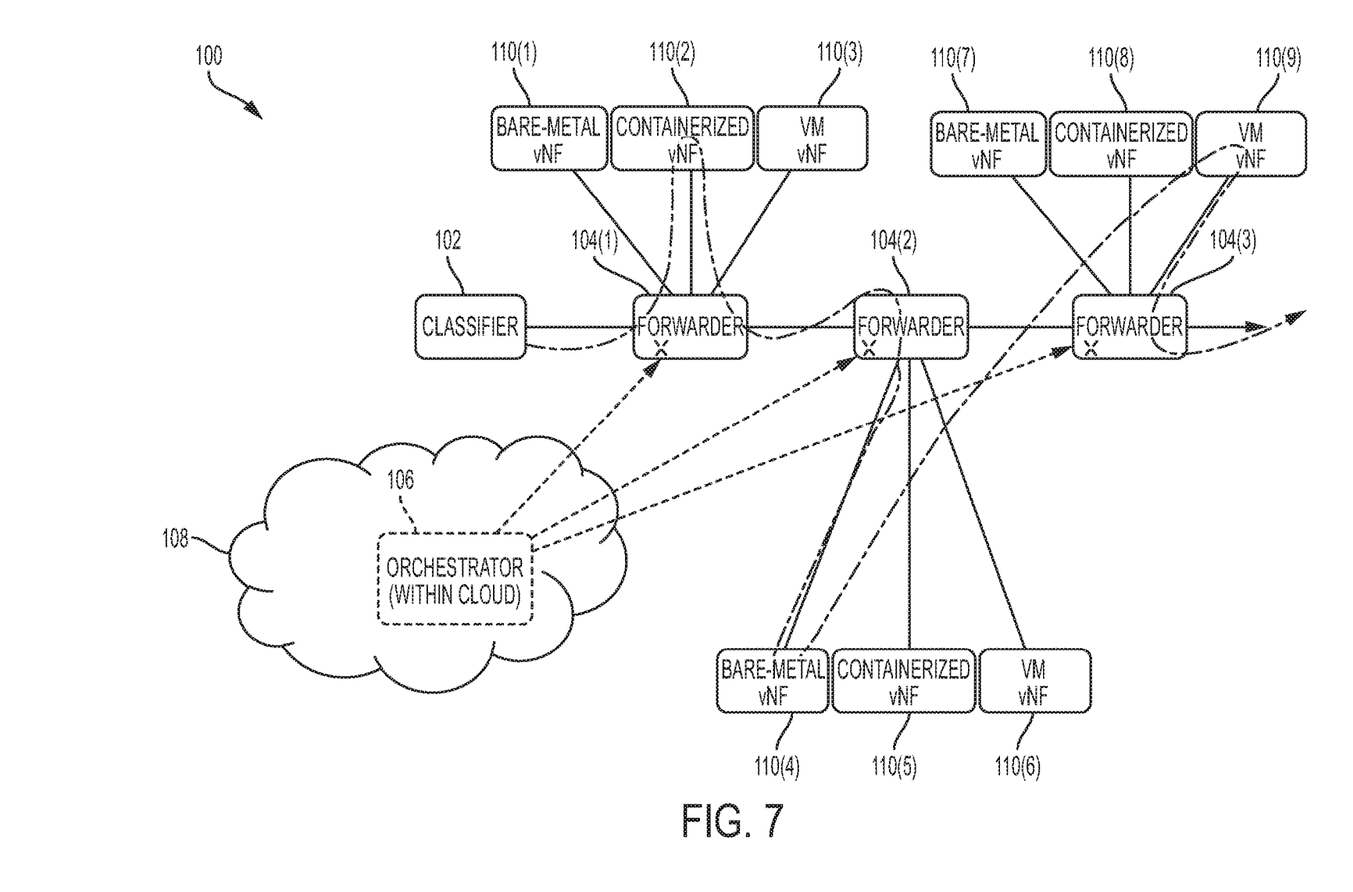
FIG. 7 is a simplified block diagram of an SFC-enabled domain in which embodiments described herein for implementing loose hop service function chains using price information may be implemented.

Referring to FIG. 7, illustrated therein is an SFC-enabled domain 100 in which a potential use case of loose hop SFCs as described herein is shown as being implemented. The example shown in FIG. 7 is presented for purposes of illustration only and it will be recognized that the use case is one of many potential use cases.

As shown in FIG. 7, the domain 100 includes a classifier 102, several forwarding elements, represented in FIG. 7 by forwarders 104(1)-104(3), and an orchestrator 106, which may be disposed within a cloud environment 108 and which is connected to each of the forwarders 104(1)-104(3) for purposes to be described in greater detail hereinbelow. As shown in FIG. 7, each of the forwarders 104(1)-104(3) has connected thereto three representative vNFs, including a bare metal vNF (represented in FIG. 7 by bare metal vNFs 110(1)-110(3)), a containerized vNF (represented in FIG. 7 by metal vNFs 110(4)-110(6)), and a VM vNF (represented in FIG. 7 by VM vNFs 110(7)-110(9)). In accordance with features of embodiments described herein, the classifier 102 classifies packets onto a service path without explicitly defining each vNF of the service path.

In certain embodiments, the NSH may carry a specific identifier to indicate whether a static SFC or a loose hop chain is being specified. For example, the SPI/SI may be set to a specific, preidentified, value that identifies the loose hop chain and therefore differentiates it from standard (static) SFCs. In such embodiments, when the traffic arrives at a forwarder, the forwarder understands that the next hop needs to be identified based on specific criteria that may include the metadata of the NSH or any other criteria to determine the next hop. As a result, static SFCs and loose hop chains in accordance with features defined herein may be deployed in the same environment using the same vNF and forwarding components.

As previously noted, current SFCs are defined per profile and per price. The amount someone pays for a certain service typically defines what kind of and how policies are enforced. Implementing such dedicated SFCs results in significant administrative overhead, as well as requiring manual updates in case of price and/or policy changes. Embodiments described herein use price, or cost, values to define a loose hop chain that is modular enough to adapt to different price ranges/levels. For example, a loose hop chain may be defined for a set of prices {X, Y, Z}. Price X uses the chain in a way reflecting a higher price paid by the subscriber, price Y uses the same chain in a manner reflecting a moderate price paid by the subscriber, and price Z uses the same chain in a manner reflecting a lowest price paid by the subscriber. A loose hop chain defines the hops but does not define strict flows and flow rules. In other words, for higher priced traffic, services can be selected that provide better, premium performance (or some other criteria defined by the operator). While part of the same service chain, the pricing information incorporated into the metadata fields of the SFC Metadata Type 1 or Type 2 header fields allow selection of the loosely defined hops based on pricing information. This allows the definition of a single SFC with required network services while being modular and flexible enough to adjust to pricing details. The pricing information is defined and managed centrally by the orchestrator, thereby allowing cloud providers to update pricing and associated policy details to maintain the loose hop chain while modifying parameters.

Referring again to FIG. 7, the service path is defined by the classifier 102 in such a way that maintains the concept of a static SFC while allowing each forwarder 104(1)-104(3), in communication with the orchestrator 106, to select particular vNFs to which to forward traffic dynamically and "on-the-fly" at the forwarder. As a result, while a service path is identified for a packet, each hop of the service path is loosely defined at the classifier. The classifier defines a service path consisting of the required forwarders without specifically defining what vNFs are involved in the path; it is the forwarder's task to determine, based on the metadata in the NSH and other relevant information, the vNF to which a packet is forwarded for processing. As a result, the classifier only needs to be aware of the forwarder and does not need to have knowledge or understanding of the loose hop chain vNFs. This differs from static SFCs, in which the classifier defines the SPI and SI that includes the vNFs up front.

The classification of traffic typically occurs using the well-defined 5-tuple information a flow provides (src IP, dst IP, port and IP protocol). However, the classifier can also use other information to classify traffic as "interesting" for the SFC. Here, we propose using monetary values in addition to the 5-tuple information to classify traffic and to define (or select pre-defined) forwarding rules on the SFF to select the next-hop SF.

As described herein, loose hop chains are loosely defined service function chains in which a specific chain Is not pre-defined per flow. Rather, monetary values (price or cost) and associated service path information are leveraged to adjust the SFC "on-the-fly," thereby allowing dynamic updating of an SFC based on those values and potentially adding more chain options by adding additional values. In addition to the monetary values and other relevant information, service path information is correlated to the monetary values, such that a specific service path is defined for a specific monetary value and components within the SFC can make use of this correlation.

The SFF (forwarder or forwarding element) uses the monetary (cost) values incorporated into the MD-Type 1 or MD-Type 2 Metadata fields to select forwarding rules to next-hop vNFs. Cost value X, for example, could refer to a forwarding rule specified to forwarding traffic to a vNF deployed in a VM, whereas cost value Y could refer to a forwarding rule that defines a bare metal deployment of the vNF. In this manner, the SFF can be used, based on the pricing information, to select vNFs and forward traffic accordingly. While the SFF is configured with rules, it is already aware of the vNF hops. However, traffic is forwarded based on the cost values transmitted in the metadata fields in accordance with loose hope function chains as described herein. While vNFs are predefined, the actual selection of a particular vNF is dependent on the monetary values transmitted in the NSH.

As previously noted, the monetary values may be incorporated into either MD-Type 1 or MD-Type 2 NSH headers. For MD Type 1, fixed length optional fields are available where monetary values can be included (and optionally correlated with additional information, such as policies to be used, etc.). Using MD-Type 2 fields in the NSH allows for a variable length optional field. Again, the monetary values can be considered individually or in conjunction with other relevant information to provide further details for policy selection and enforcement on the SFF and SF components of the SFC.

As previously noted, using a loose hop chain, a single path is loosely defined so that the forwarder (in concert with the orchestrator) makes the decision to which vNF to forward the packet based on the monetary value included in the MD-Type 1 or MD-Type 2 NSH headers.

The loose hop SFC dynamically adjusts based on information from the orchestrator 106 to select the appropriate vNF deployment type at the forwarder 104(1)-104(3). The orchestrator provides the required information, or rule, to the forwarder to enable the forwarder to make the decision based on the information retrieved from the NSH metadata Type 1 or Type 2 fields. That may be done for the first packet for a flow, every packet of a flow, or at a specific frequency to ensure that the metadata has not changed. The forwarder checks with the orchestrator for a specific packet and its metadata to look up forwarding and vNF selection rules. Different mechanisms may be used to limit the amount of communication between the forwarder and the orchestrator. For example, the orchestrator may be pushing out information, reducing the load on the forwarder to initiate requests. Alternatively, the forwarder may handle requests to the orchestrator in a bulk manner to obtain details for multiple packets at the same time. A variety of other ways may be used to reduce the number of control packets.

Figure 8:
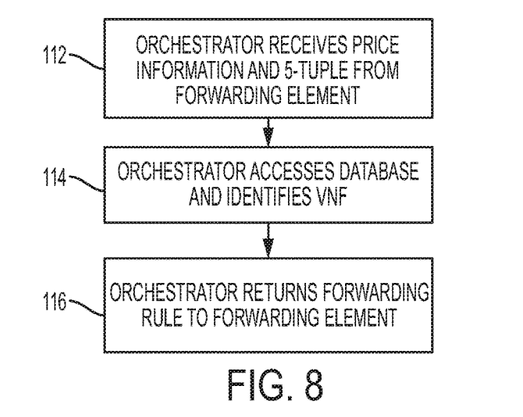
FIG. 8 is a flow diagram illustrating steps that may be implemented at an orchestrator element of the SFC-enabled domain of FIG. 7 in accordance with embodiments described herein for implementing loose hop service function chains using price information.

FIG. 8 is a flow diagram illustrating steps that may be implemented at an orchestrator element, such as the orchestrator 106 (FIG. 7), in accordance with embodiments described herein for implementing loose hop service function chains. In step 112, the orchestrator receives price information (comprising metadata stored in the MD-Type 1 or MD-Type 2 NSH context headers) and a 5-tuple identifying the packet flow from a forwarder responsive to receipt and decapsulation of a packet at the forwarder. In step 114, the orchestrator accesses a database associated therewith and uses the price information and 5-tuple to identify a vNF within its database. The database, which may be included in a memory device of the orchestrator, may be pre-populated by the cloud/SFC operator. In particular, the 5-tuple is used to identify a flow e.g., by source/destination IP, port, and protocol. The price information is used to identify the vNF. In certain embodiments, the 5-tuple and metadata are both used to associate a type with the price information and the selected vNF. In step 116, the orchestrator informs the SFF of the selected vNF and sends to the forwarder a forwarding rule that defines the next hop from the forwarder.

Figure 9:
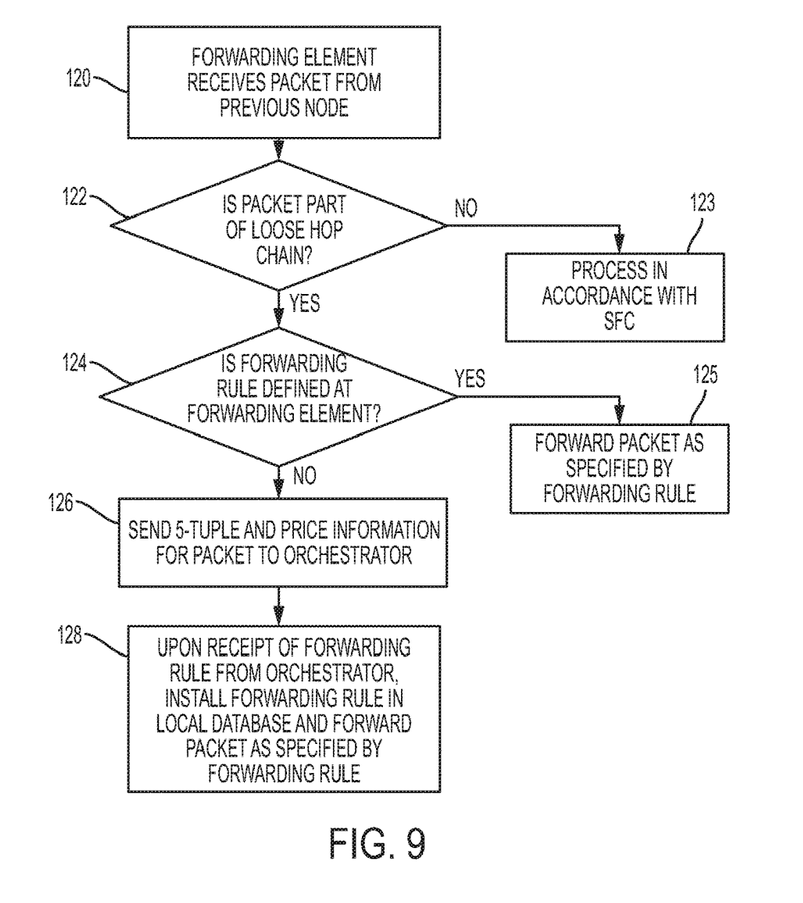
FIG. 9 is a flow diagram illustrating steps that may be implemented at forwarding elements of the SFC-enabled domain of FIG. 7 in accordance with embodiments described herein for implementing loose hop service function chains using price information.

FIG. 9 is a flow diagram illustrating steps that may be implemented at forwarding elements, such as forwarding elements 104(1)-104(3) (FIG. 7), in accordance with embodiments described herein for implementing loose hop service function chains. In step 120, the forwarding element receives a packet from a previous node. In step 122, the forwarding element determines whether the packet is part of a loose hop chain. In certain embodiments, this may be accomplished by looking at the SPI/SI of the packet's NSH, as described above. If the packet is determined not to be part of a loose hop chain, execution proceeds to step 123, in which the packet is processed as defined by generic SFC implementations. If the packet is determined to be part of a loose hop chain, execution proceeds to step 124, in which the forwarder looks up the price information and checks the local database (which may reside in a memory element of the forwarding element) to determine whether a forwarding rule for the packet has already been defined by the orchestrator. If so, the forwarding element simply forwards the packet to the vNF defined by the rule in step 125. Otherwise, in step 126, the price information along with a 5-tuple identifying the packet flow is sent to the orchestrator to lookup what vNF to choose for the packet. In step 128, when the forwarding element receives the requested information from the orchestrator, it installs the forwarding rule in its local database and continues processing the packet accordingly (i.e., by forwarding it to the vNF identified by the forwarding rule for processing).

The orchestrator and forwarding element may frequently exchange control plane messages to exchange updates for already installed rules and loose hop definitions. As a result, the orchestrator can push out updates to already defined next hops without the forwarding element having to re-request a lookup. In general, a rule on the forwarder is based on the 5-tuple and typically indicates a simple forwarding decision. In certain embodiments, the orchestrator maintains the state and performs the selection of vNFs based on the forwarded 5-tuple and price information, after which it forwards the vNF section decision to the forwarder by installing a forwarding rule thereon. Alternatively, the functionality could be extended by providing the forwarder with a subset of the intelligence provided on the orchestrator, such that when the forwarder receives a packet, it may be able to perform vNF selection lookups based on the 5-tuple and price information. The forwarder could store the information in a frequently updated database and look up details on the fly. This scenario could be used in an additional manner in which to define forwarding decisions on the forwarders. In certain embodiments, the 5-tuple and price information of the first packet of a flow may be processed by the orchestrator, while subsequent packets of the same flow could be processed directly by the forwarder.

Figure 10:
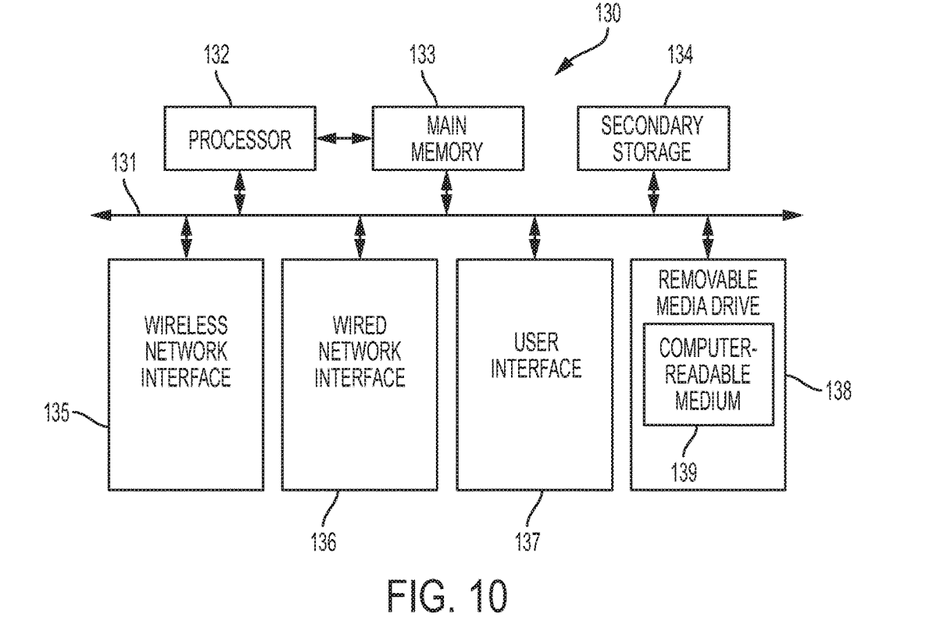
FIG. 10 is a simplified block diagram of a machine comprising an element of a communications network in which embodiments described herein for implementing loose hop service function chains using price information may be implemented.

Turning to FIG. 10, FIG. 10 illustrates a simplified block diagram of an example machine (or apparatus) 130, which in certain embodiments may be a classifier or a forwarding element, that may be implemented in embodiments described herein. The example machine 130 corresponds to network elements and computing devices that may be deployed in a communications network, such as a classifier or a forwarding element. In particular, FIG. 10 illustrates a block diagram representation of an example form of a machine within which software and hardware cause machine 130 to perform any one or more of the activities or operations discussed herein. As shown in FIG. 10, machine 130 may include a processor 132, a main memory 133, secondary storage 134, a wireless network interface 135, a wired network interface 136, a user interface 137, and a removable media drive 138 including a computer-readable medium 139. A bus 131, such as a system bus and a memory bus, may provide electronic communication between processor 132 and the memory, drives, interfaces, and other components of machine 130.

Processor 132, which may also be referred to as a central processing unit ("CPU"), can include any general or special-purpose processor capable of executing machine readable instructions and performing operations on data as instructed by the machine-readable instructions. Main memory 133 may be directly accessible to processor 132 for accessing machine instructions and may be in the form of random access memory ("RAM") or any type of dynamic storage (e.g., dynamic random access memory ("DRAM")). Secondary storage 134 can be any non-volatile memory such as a hard disk, which is capable of storing electronic data including executable software files. Externally stored electronic data may be provided to computer 130 through one or more removable media drives 138, which may be configured to receive any type of external media such as compact discs ("CDs"), digital video discs ("DVDs"), flash drives, external hard drives, etc.

Wireless and wired network interfaces 135 and 136 can be provided to enable electronic communication between machine 130 and other machines, or nodes. In one example, wireless network interface 135 could include a wireless network controller ("WNIC") with suitable transmitting and receiving components, such as transceivers, for wirelessly communicating within a network. Wired network interface 136 can enable machine 130 to physically connect to a network by a wire line such as an Ethernet cable. Both wireless and wired network interfaces 135 and 136 may be configured to facilitate communications using suitable communication protocols such as, for example, Internet Protocol Suite ("TCP/IP"). Machine 130 is shown with both wireless and wired network interfaces 135 and 136 for illustrative purposes only. While one or more wireless and hardwire interfaces may be provided in machine 130, or externally connected to machine 130, only one connection option is needed to enable connection of machine 130 to a network.

A user interface 137 may be provided in some machines to allow a user to interact with the machine 130. User interface 137 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 138 represents a drive configured to receive any type of external computer-readable media (e.g., computer-readable medium 139). Instructions embodying the activities or functions described herein may be stored on one or more external computer-readable media. Additionally, such instructions may also, or alternatively, reside at least partially within a memory element (e.g., in main memory 133 or cache memory of processor 132) of machine 130 during execution, or within a non-volatile memory element (e.g., secondary storage 134) of machine 130. Accordingly, other memory elements of machine 130 also constitute computer-readable media. Thus, "computer-readable medium" is meant to include any medium that is capable of storing instructions for execution by machine 130 that cause the machine to perform any one or more of the activities disclosed herein.

Not shown in FIG. 10 is additional hardware that may be suitably coupled to processor 132 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 130 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 130 to appropriately manage the operation of the hardware components therein.

The elements, shown and/or described with reference to machine 130, are intended for illustrative purposes and are not meant to imply architectural limitations of machines such as those utilized in accordance with the present disclosure. In addition, each machine may include more or fewer components where appropriate and based on particular needs. As used in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein may be implemented in software in. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

In one example implementation, classifier and forwarding elements, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 133, secondary storage 134, computer-readable medium 139) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 132) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM"), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of communications network described herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method of dynamically adjusting a service function chain in a Service Function Chain ("SFC")-enabled network based on price information, the method comprising:
    receiving at a forwarding node of the SFC-enabled network a packet having a packet header including at least one context header comprising metadata information for the packet, wherein the metadata information comprises price information indicative of a value of a traffic flow of which the packet comprises a part;
    determining a loose hop service function chain for the traffic flow, wherein the loose hop service function chain comprises a plurality of Virtual Network Functions ("vNFs") for processing packets of the traffic flow;
    identifying based on the price information and at least one of network state and environmental information a specific Virtual Network Function ("vNF") of the plurality of vNFs that comprise the loose hop service function chain to which to forward the packet for processing; and
    forwarding the packet to the identified specific vNF for processing.

2. The method of claim 1, wherein the identifying comprises:
    forwarding the price information to a network orchestrator connected to the forwarding node, wherein the network orchestrator uses the received price information to select a forwarding rule associated with the packet from a database of forwarding rules; and
    receiving the selected forwarding rule from the orchestrator;
    wherein the forwarding the packet to the identified specific vNF comprises executing by the forwarding node the received forwarding rule.

3. The method of claim 2, wherein the identifying further comprises forwarding to the orchestrator a 5-tuple identifying a flow to which the packet belongs along with the price information, wherein the 5-tuple is used along with the received price information to select the forwarding rule associated with the packet.

4. The method of claim 1, wherein the packet header comprises a Network Services Header ("NSH").

5. The method of claim 4, wherein the price information comprises at least one of Network Services Header ("NSH") Type 1 metadata and NSH Type 2 metadata.

6. The method of claim 1, wherein the identified specific vNF comprises at least one of a bare metal vNF, a containerized vNF, and a virtual machine ("VM") vNF.

7. The method of claim 1, wherein the plurality of vNFs are connected to the forwarding node and the identified specific vNF is selected from the plurality vNFs that are connected to the forwarding node.

8. The method of claim 1, wherein the method further comprises:
    upon receiving the packet at the forwarding node, determining whether the packet is to be processed using a loose hop chaining function.

9. The method of claim 8, wherein the packet header includes a Service Path Identifier ("SPI") field and a Service Index ("SI") field and wherein the determining whether the packet is to be processed using the loose hop chaining function comprises determining that at least one of the SPI field and the SI field contains a predetermined value.

10. One or more non-transitory tangible media that includes code for execution and when executed by a processor is operable to perform operations for dynamically adjusting a service function chain in a Service Function Chain ("SFC")-enabled network based on price information, the operations comprising:
    receiving at a forwarding node of the SFC-enabled network a packet having a packet header including at least one context header comprising metadata information for the packet, wherein the metadata information comprises price information indicative of a value of a traffic flow of which the packet comprises a part;
    determining a loose hop service function chain for the traffic flow, wherein the loose hop service function chain comprises a plurality of Virtual Network Functions ("vNFs") for processing packets of the traffic flow;
    identifying based on the price information and at least one of network state and environmental information a specific Virtual Network Function ("vNF") of the plurality of vNFs that comprise the loose hop service function chain to which to forward the packet for processing; and
    forwarding the packet to the identified specific vNF for processing.

11. The media of claim 10, wherein the identifying comprises:
    forwarding the price information to a network orchestrator connected to the forwarding node, wherein the network orchestrator uses the received price information to select a forwarding rule associated with the packet from a database of forwarding rules; and
    receiving the selected forwarding rule from the orchestrator;
    wherein the forwarding the packet to the identified specific vNF comprises executing by the forwarding node the received forwarding rule.

12. The media of claim 11, wherein the identifying further comprises forwarding to the orchestrator a 5-tuple identifying a flow to which the packet belongs along with the price information, wherein the 5-tuple is used along with the received price information to select the forwarding rule associated with the packet.

13. The media of claim 10, wherein the packet header comprises a Network Services Header ("NSH") and wherein the price information comprises at least one of Network Services Header ("NSH") Type 1 metadata and NSH Type 2 metadata.

14. The media of claim 10, wherein the identified specific vNF comprises at least one of a bare metal vNF, a containerized vNF, and a virtual machine ("VM") vNF.

15. The media of claim 10, wherein the packet header includes a Service Path Identifier ("SPI") field and a Service Index ("SI") field, the operations further comprising:
upon receiving the packet at the forwarding node, determining whether the packet is to be processed using a loose hop chaining function, wherein the determining whether the packet is to be processed using the loose hop chaining function comprises determining that at least one of the SPI field and the SI field contains a predetermined value.

16. An apparatus for dynamically adjusting a service function chain in a Service Function Chain ("SFC")-enabled network based on price information, the apparatus comprising:
a memory element configured to store data; and
a processor operable to execute instructions associated with the data;
the instructions configured to cause the processor to perform operations comprising:
receiving at a forwarding node of the SFC-enabled network a packet having a packet header including at least one context header comprising metadata information for the packet, wherein the metadata information comprises price information indicative of a value of a traffic flow of which the packet comprises a part;
determining a loose hop service function chain for the traffic flow, wherein the loose hop service function chain comprises a plurality of Virtual Network Functions ("vNFs") for processing packets of the traffic flow;
identifying based on the price information and at least one of network state and environmental information a specific Virtual Network Function ("vNF") of the plurality of vNFs that comprise the loose hop service function chain to which to forward the packet for processing; and
forwarding the packet to the identified specific vNF for processing.

17. The apparatus of claim 16, wherein the identifying comprises:
forwarding the price information to a network orchestrator connected to the forwarding node, wherein the network orchestrator uses the received price information to select a forwarding rule associated with the packet from a database of forwarding rules; and
receiving the selected forwarding rule from the orchestrator;
wherein the forwarding the packet to the identified specific vNF comprises executing by the forwarding node the received forwarding rule.

18. The apparatus of claim 17, wherein the identifying further comprises forwarding to the orchestrator a 5-tuple identifying a flow to which the packet belongs along with the price information, wherein the 5-tuple is used along with the received price information to select the forwarding rule associated with the packet.

19. The apparatus of claim 16 wherein the identified specific vNF comprises at least one of a bare metal vNF, a containerized vNF, and a virtual machine ("VM") vNF.

20. The apparatus of claim 18, wherein the packet header includes a Service Path Identifier ("SPI") field and a Service Index ("SI") field, the operations further comprising:
upon receiving the packet at the forwarding node, determining whether the packet is to be processed using a loose hop chaining function, wherein the determining whether the packet is to be processed using the loose hop chaining function comprises determining that at least one of the SPI field and the SI field contains a predetermined value.

\* \* \* \* \*

UNITED STATES PATENT AND TRADEMARK OFFICE
CERTIFICATE OF CORRECTION

| | | |
|---|---|---|
| PATENT NO. | : 10,333,822 B1 | Page 1 of 1 |
| APPLICATION NO. | : 15/602638 | |
| DATED | : June 25, 2019 | |
| INVENTOR(S) | : Sebastian Jeuk et al. | |

It is certified that error appears in the above-identified patent and that said Letters Patent is hereby corrected as shown below:

On the Title Page

Item (54) Title:
Please change "TECHNIQUES FOR IMPLEMENTING LOOSE HOP SERVICE FUNCTION CHAINS PRICE INFORMATION" to --TECHNIQUES FOR IMPLEMENTING LOOSE HOP SERVICE FUNCTION CHAINS USING PRICE INFORMATION--

Signed and Sealed this
Thirteenth Day of August, 2019

Andrei Iancu
*Director of the United States Patent and Trademark Office*